United States Patent [19]

Vogt et al.

[11] Patent Number: 5,606,743
[45] Date of Patent: Feb. 25, 1997

[54] RADIO EYEWEAR

[76] Inventors: Paul A. Vogt, 1058 Ottawa Ave., West St. Paul, Minn. 55118; James D. Denney, 10481 Joliet Ave., Stillwater, Minn. 55082

[21] Appl. No.: 168,064

[22] Filed: Dec. 13, 1993

Related U.S. Application Data

[63] Continuation-in-part of Ser. No. 644,275, Jan. 22, 1991.

[51] Int. Cl.$^6$ .................................................. H04B 1/08
[52] U.S. Cl. ........................ 455/347; 455/90; 455/344; 455/350; 16/228; 351/106; 351/111; 351/153; 351/158; 381/68.5
[58] Field of Search ........................... 381/68.1, 68.5; 455/344, 347, 348, 349, 350, 351, 269, 89, 90; 351/43, 112, 118, 158, 111, 116, 119, 121, 90–92, 98, 105–106, 103, 124, 129–130, 153; 345/7, 9; 343/718, 702; 16/228

[56] References Cited

U.S. PATENT DOCUMENTS

| | | | |
|---|---|---|---|
| 2,794,085 | 5/1957 | Andelis | 381/68.5 |
| 2,830,132 | 4/1958 | Borg | 381/68.5 |
| 2,856,466 | 10/1958 | Gustafson et al. | 381/68.5 |
| 3,095,483 | 6/1963 | Tresise et al. | 429/98 |
| 3,329,957 | 7/1967 | Hoynes | 343/718 |
| 3,769,663 | 11/1973 | Perl | 361/158 |
| 3,943,925 | 3/1976 | Leight | 351/158 |
| 4,636,866 | 1/1987 | HaTTori | 340/705 |
| 4,648,130 | 3/1987 | Kuznetz | 455/351 |
| 4,682,363 | 7/1987 | Goldfarb et al. | 455/350 |
| 4,712,244 | 12/1987 | Zwicker et al. | 381/68.1 |
| 4,753,514 | 6/1988 | Kubik | 351/158 |
| 4,796,987 | 1/1989 | Linden | 351/43 |
| 4,824,233 | 4/1989 | Jannard | 351/47 |
| 4,856,086 | 8/1989 | McCullough | 455/350 |
| 4,858,248 | 8/1989 | Goldsmith | 455/351 |
| 4,864,646 | 9/1989 | Nesbit et al. | 455/351 |
| 4,882,769 | 11/1989 | Galliemore | 455/344 |
| 4,904,078 | 2/1990 | Gorike | 351/158 |
| 4,952,024 | 8/1990 | Gale | 358/88 |
| 5,003,300 | 3/1991 | Wells | 340/705 |
| 5,020,150 | 5/1991 | Shannon | 455/343 |
| 5,059,017 | 10/1991 | Bennato | 351/121 |
| 5,106,179 | 4/1992 | Kamaya et al. | 351/158 |
| 5,128,659 | 7/1992 | Roberts et al. | 340/705 |
| 5,133,596 | 7/1992 | Korney et al. | 351/158 |
| 5,146,619 | 9/1992 | Brown | 455/344 |
| 5,323,189 | 6/1994 | Contreras | 351/158 |

FOREIGN PATENT DOCUMENTS

| | | | |
|---|---|---|---|
| B122705 | 12/1957 | Germany | 381/68.5 |
| 59-115571 | 7/1984 | Japan | 136/291 |
| 3280626 | 12/1991 | Japan | 455/269 |
| 1363723 | 8/1974 | United Kingdom | 381/187 |

*Primary Examiner*—Reinhard J. Eisenzopf
*Assistant Examiner*—Lee Nguyen
*Attorney, Agent, or Firm*—D. L. Tschida

[57] ABSTRACT

Eyewear including a radio receiver, speakers, antenna and power supply which are variously coupled to or integrally formed with a lens supporting framework. In non-integral constructions the receiver, power supply and speaker assemblies detachably clip mount to bridge and bow pieces or are combined with the speakers and pivotally supported from the bows. In various integral constructions, the speakers removeably interlock with the bows in pivotal and slide adjustable relation. Other eyewear assemblies provide visor mounted solar panels and/or recharging means; laminated displays that are directly viewable by the user; integral antennas and/or contacts to couple the user to the radio recevier; electrified speaker sockets, hinges and plug connectors; and flexible hinge couplers.

26 Claims, 18 Drawing Sheets

RADIO EYEWEAR

PRIOR APPLICATIONS

This is a continuation-in-part of co-pending application Ser. No. 07/644,275, filed Jan. 22, 1991.

BACKGROUND OF THE INVENTION

The present invention relates to radio receivers and, in particular, to receiver and speaker means adapted to eyewear supporting frameworks.

With growing public awareness and participation of the general public in various physical fitness activities has evolved a growing demand for pocket or belt mounted radios/tape players and the like. These assemblies preferably are constructed for convenience of personal transport and use while jogging, bicycling, roller blading, or participating in other physical activities. The typical construction provides a separate radio receiver, which is attachable to the user, and a pair of light weight headphones or speakers which plug mount to the receiver.

A number of commercially available headset assemblies provide a receiver which is mounted within a resilient headband, and which terminates at a pair of end mounted speakers. Although these latter assemblies provide for a hands-off mounting, most such assemblies are relatively heavy. The ear phones also tend to be rather large and cumbersome which over time can produce perspiration and minimize the flexibility of use by individuals who may require or prefer to use correctional eyewear or sunglasses with the headsets.

Numerous commercially available miniature speakers also exist that are insertable directly within a user's ears or are supported from detached resilient head bands and separately plug into a receiver. Varieties of devices also exist which provide speaker containing neck bands or head bands. The constructional details of these devices can be found upon directing attention to U.S. Pat. Nos. 4,864,646; 4,858, 248; 4,682,363; and 4,648,130. The U.S. Pat. No. 4,682,363 assembly also provides for a contained radio receiver which cooperates with sealed air tubes in an amphibious environment.

U.S. Pat. Nos. 4,882,769 and 4,856,086 also disclose eyewear frames which provide integral radio receivers. The ear phones or speakers for the former assembly plug mount to the frame and slide along head contacting bows. The speakers and related conductors of the latter assembly store within the bows.

In contrast to the latter eyewear, the subject invention provides a variety of eyewear constructions which accommodate varieties of lens types relative to various plug mounted, pivoting ear phones or speakers. The speakers may be rotationally and length adjustably positioned in spring biased relation to the user, independent of the bows. The circuitry is compactly nested within the eyewear frame and durably coupled together and to the user via resilient hinging. In one construction, a solar panel supplements operating power and recharges a contained battery source.

SUMMARY OF THE INVENTION

It is accordingly a primary object of the present invention to provide radio receiver and speaker apparatus adaptable to conventional eyewear.

It is a further object of the invention to provide eyewear capable of receiving and securely retaining varieties of styles and types of lenses to the eyewear.

It is a further object of the invention to provide receiver constructions which clip mount to the bridge or bow portions of eyewear frames and wherein the necessary power supplies are self-contained.

It is a further object of the invention to provide eyewear frames which may be coupled to a separately supported battery pack and/or which may include integral conductors or an antenna that extends through the frame portions and/or contacts which couple the user as an antenna to the radio receiver.

It is a further object of the invention to provide eyewear frames including ear phone assemblies which are pivotally integrated into the frames and/or which plug mount to the frames and whereby the user may selectively engage the speakers with the ears.

It is a further object of the invention to provide eyewear frames including an integral radio receiver and further including selectively removable and/or pivoting and selectively extensible earphones.

It is a further object to provide receiver controls which are appended to the eyewear, such that the user may tune and directly view selected control parameters without removing the eyewear.

It is a still further object of the inventor to provide means for recharging the battery source from converted AC power or from converted solar radiation.

Various of the foregoing objects, advantages and distinctions of the invention are achieved in a variety of alternative assemblies. In one such construction, a radio receiver includes means for coupling the receiver to the bridge or bow portions of an eyewear framework. Necessary tuner controls are provided with the receiver. Battery power is obtainable from a contained power source or alternatively via a separately carried battery pack which plug couples to the receiver. In another related construction, separate earphone containing receiver and battery compartments are pivotally supported from the eyewear frames.

In other constructions, various eyewear frames include rigid or removable lenses and incorporate the receiver and batteries into the bridge or bow pieces of the framework in combination with pivotally mounted, removable earphones. Necessary tuner controls project from the bridge or bow pieces for access by the user. Covers resiliently clip to the bridge or bow pieces to contain the battery and/or receiver circuitry.

In still other constructions the receiver controls are mounted within the bridge and bow pieces and/or may be laminated to the lense to be viewable without removing the eyewear. Various earphone assemblies couple to the bow pieces at integral electrical terminations, and pivotally retain the earphones in spring biased relation to the user's ears and/or frame. Still other constructions of the earphones variously provide vertically and horizontally extendable spring support arms, pivoting speakers and coupler portions which key and interlock the speaker to the eyewear frame or support arm.

Various other frame constructions provide integral conductors; flexible hinges which contain the conductors; hinges which couple discontinuous portions of the conductors to each other; integral antennas; and electrical contacts which couple the user to the circuitry as an antenna. Also contemplated are frames which include recharging circuitry, solar panels and laminated displays or reflectors for selecting stations without removing the eyewear.

Still other objects, advantages and distinctions of the invention, along with a detailed description of the presently preferred constructions, can be obtained upon reference to the following description with respect to the appended drawings. To the extent various alternative constructions, modifications and improvements have been considered, they are described as appropriate. The description should not be interpreted in limitation of the invention, which rather should be interpreted within the scope of the following claims.

DESCRIPTION OF THE PREFERRED EMBODIMENT

Figure 1:
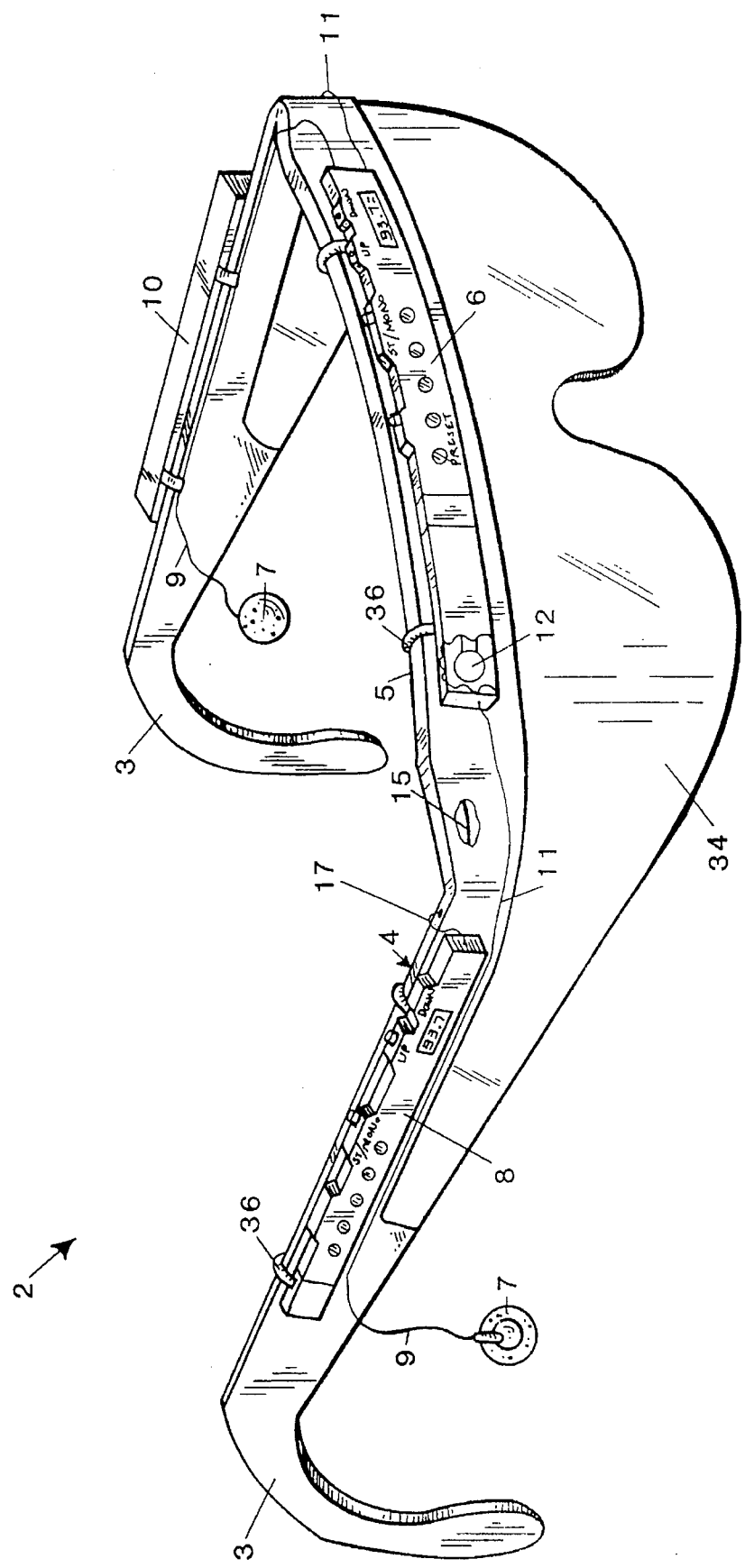
FIG. 1 is an isometric drawing of eyewear including a clip coupled radio receiver and/or power supply and plug-in earphones.
Figure 2:
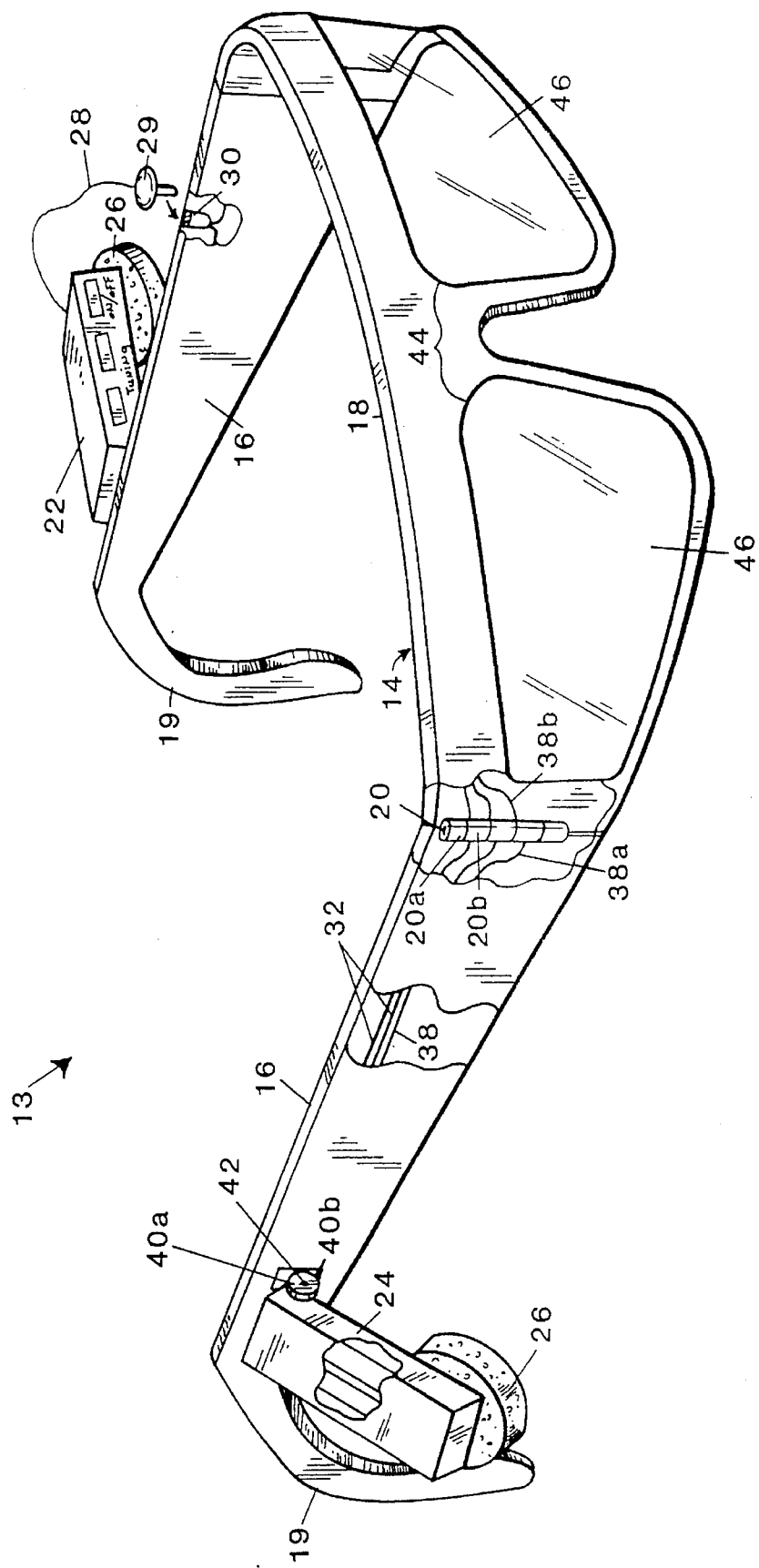
FIG. 2 is an isometric drawing of eyewear including separate, pivotally mounted compartments containing the receiver circuitry and power supply.

Referring to FIGS. 1 and 2, alternative assemblies are shown of radio receiver containing eyewear of the present invention, which provide varying degrees of integration of the radio receiver into the eyewear. FIG. 1 shows an eyewear assembly 2 having a one-piece molded unitary frame 4 that supports a shield type lens 34. The frame 4 includes a pair of bows 3 which connect to a brow portion 5. Clip mounted to the brow portion 5 is battery powered radio receiver 6. Separate earphones or speakers 7 plug mount to the receiver 6 via conductors 9. An antenna (not shown) is contained within the receiver 6, along with batteries 12.

FIG. 1 also shows an alternative arrangement of a radio receiver 8 and detached power supply 10. That is, in lieu of a unitary receiver 6, the radio receiver 8 and battery compartment 10 are separately clipped to the upper edges of the bows 3. For this arrangement, an additional conductor 11 couples the compartments 8 and 10 to one another. The antenna 15 (shown in cutaway) for the receiver 8 is separately contained within the frame 4, although could be mounted within a multi-wire conductor, such as might contain the conductors 9 and 11. A conductor 17 extends from the housing 8 and connects to the antenna 15 at a suitable coupler and socket connection.

FIG. 2 shows an eyewear assembly 13 which provides a multi-section frame 14. The frame 14 includes a pair of bow pieces 16 and a brow or bridge piece 18 and all of which are coupled to each other at side hinges 20. Separate radio receiver and battery compartments 22 and 24 are pivotally secured adjacent the ear loops 19 at the ends of the bow pieces 16.

Each of the compartments 22 and 24 supports an earphone 26. A single wire or multi-wire conductor 28 and plug end 29 couple audio signals from the receiver 22 to a mating coupler 30 formed into the bow piece 16 adjacent the receiver 22. Multiple conductors 32, which may comprise a flexible strip circuit, extend through the frame 14 and ones of which interconnect at the coupler 30 to couple received audio to the speakers 26. Other couplers are distributed about the frame 14 and appropriately couple the battery compartment 24, the receiver 22 and the speakers 26 into an operating radio. A third conductor 38 which extends through the frame 14 acts as the antenna for the receiver 22.

Each compartment 22, 24 is coupled to its bow piece 16 via standoff projections 40a and 40b and a mating pivot pin 42. The standoffs 40a and 40b extend from opposite sides of the compartments 22, 24 and bow pieces 16 and are formed with mating serrated or sawtooth surfaces. When the compartments 22, 24 are pivoted, the mating surfaces maintain an established position. Associated receiver controls, such as switches for on/off/volume control, frequency selection, tone control etc., are provided on the receiver compartment 22, although maybe positioned elsewhere about the assembly 13.

Figure 15:
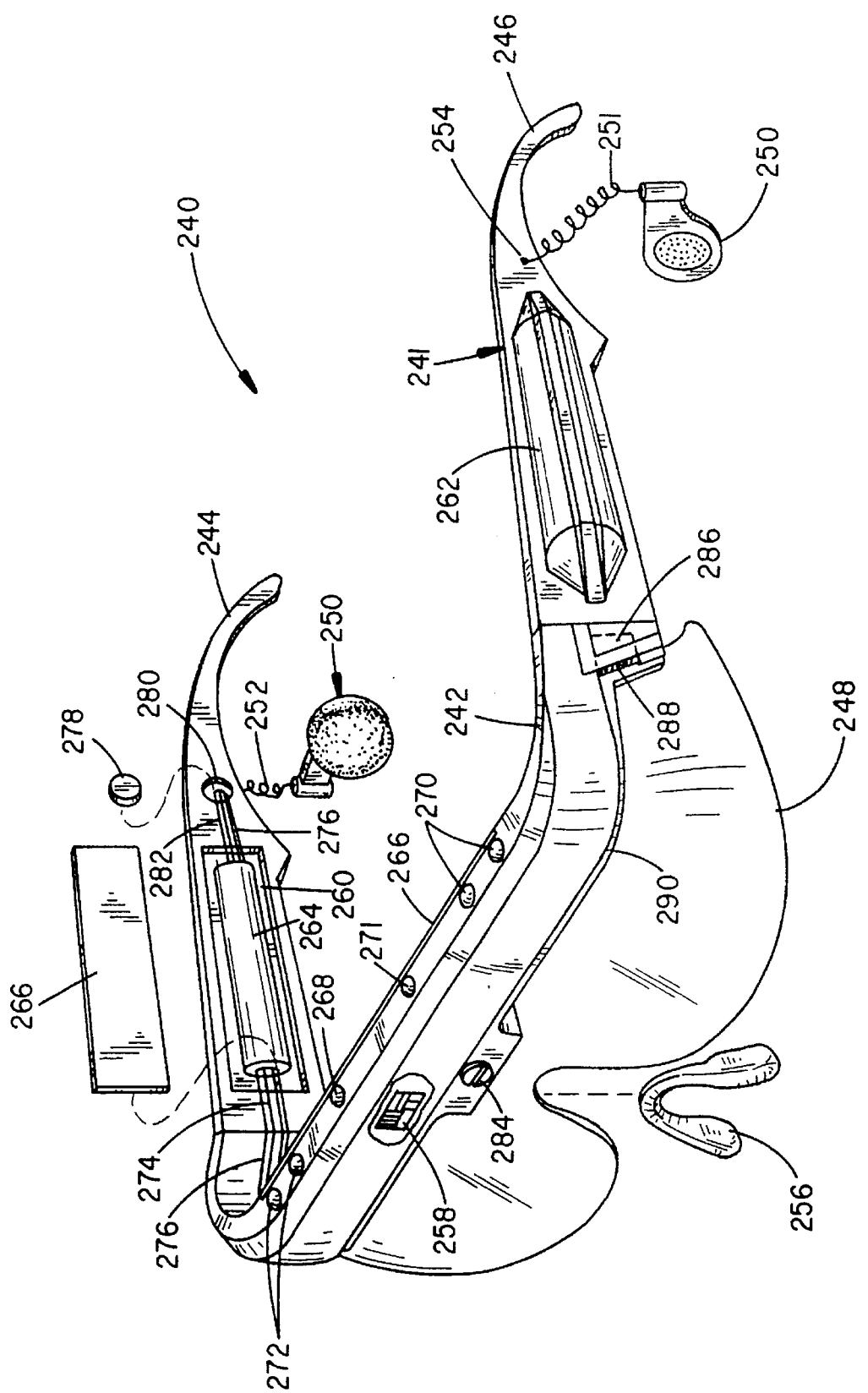
FIG. 15 is a perspective drawing of an eyewear framework depicting removeable lenses, removeable nose piece, and user antenna coupler and flexible strip circuit conductors.
Figure 16:
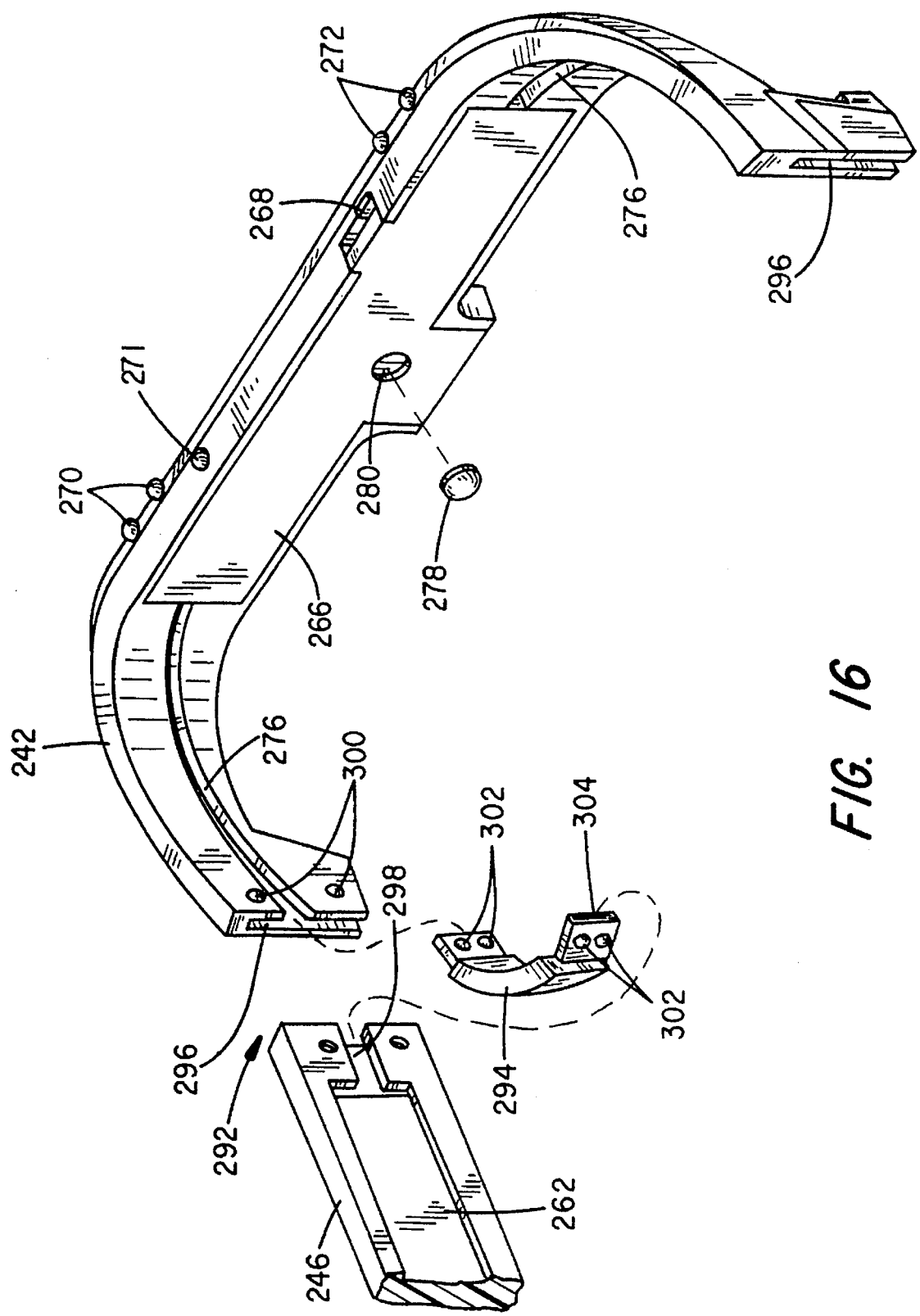
FIG. 16 is a perspective drawing shown in exploded assembly of a flexible, conduit hinge and antenna contact.
Figure 17:
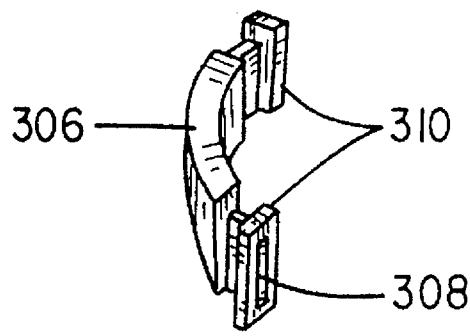
FIG. 17 is a perspective drawing of an alternative flexible hinge.
Figure 18:
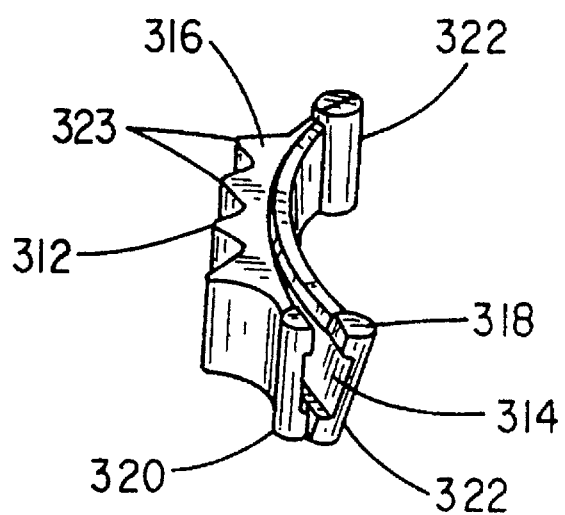
FIG. 18 is a perspective drawing of a second alternative flexible hinge.

The frame 14 is fabricated in a conventional three piece hinged construction and wherein the brow piece 18 includes separate lens receiving cavities 44. Removeable or permanent lenses 46 may be secured to the cavities 44. Other lens arrangements and attachments are discussed with respect to FIGS. 15 and 19 through 21. In lieu of routing continuous conductors 32, 38 through the hinged surfaces between the bow and brow pieces 16, 18, ends of the conductors 32, 38 may terminate at mating, electrified hinge portions 20a, 20b of each hinge 20. In such instance, the mating terminations are isolated from one another. Examples of such electrical connections are discussed below with respect to FIGS. 3 through 5. FIGS. 16, 17 and 18 depict alternative flexible hinge couplers which protect and facilitate the routing of attendant conductors between the bow and brow pieces 16, 18.

Redirecting attention to FIG. 1, the assembly 2 is formed as a two-piece assembly. A wrap-around frame 4 includes integral bow pieces 3 and brow piece 5. Secured either permanently or semi-permanently with fasteners (not shown) to a groove let into the periphery of the frame is the wrap-around lens 34. The lens 34 may be of optical quality and/or may merely provide sunscreening. FIGS. 15 and 19 through 21, discussed below, show alternative detachable lenses.

A plurality of resilient C or U-shaped clips 36 project from each of the alternative receiver compartments 6 and 8 and battery compartment 10 to appropriately secure the housings 6, 8, and/or 10 to the frame 4, depending upon the mounting configuration. Removable covers attached to the housings 6 and 10 permit periodic replacement of the batteries 12. Appropriate volume and tuning controls etc. are included with the receiver compartments 6 and 8.

Depending upon the power requirements of the receiver circuitry, only the single receiver housing 6 may be required. In such a construction, disk or wafer-like batteries 12, such as used with many watches and cameras, are used to power the receiver 6 and have been found to provide sufficient power to meet normal user demands.

Alternatively and for longer periods between battery replacements, the separate battery housing 10, which might contain AA or AAA batteries, finds advantage. To evenly distribute the weight, the battery housing 10 is normally mounted to one bow piece 3 and the receiver housing 8 is mounted to the other bow piece. Where a self-contained receiver and power supply housing 6 is used, the housing 6 is mounted to the brow piece 5.

Figure 6:
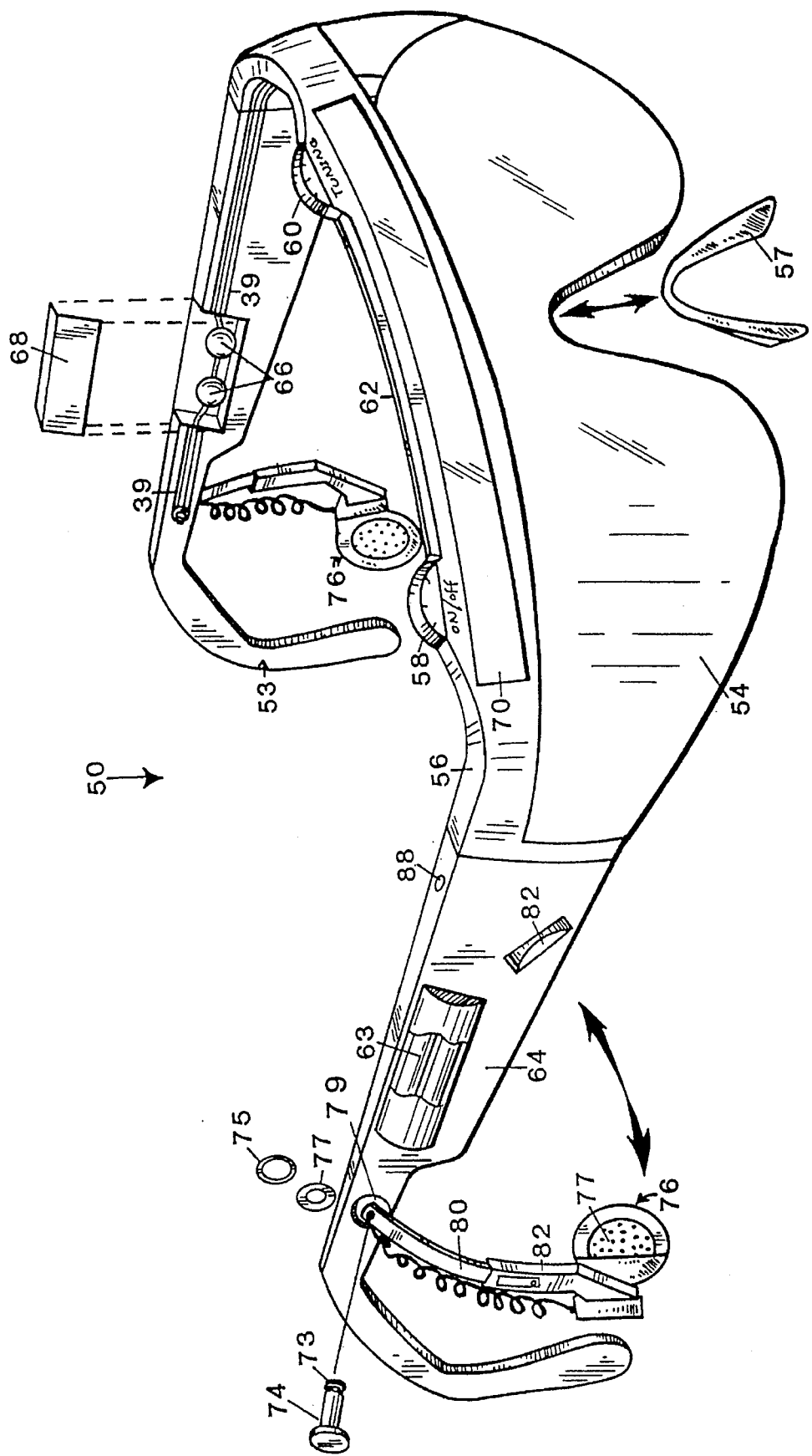
FIG. 6 is an isometric drawing of eyewear including battery containing bow pieces, riveted earphones and wireway confined conductors and an antenna.

The conductors of the assembly 2 may be routed in various external and/or internal configurations about the frame 4. For example, the conductors 9 can be routed through the frame 4 at an unobtrusively positioned groove or wireway which extends around the frame 4. FIGS. 6 and 15 Depict assemblies 13 and 240 which includes such a wireways 39 and 276.

As depicted and although only shown for the receiver 8, the speaker conductors 9 extend between suitable mating couplers at the receiver 8 and the earphone 7. The exposed conductors 9 are retained to the eyewear frame 4 at the clips 36. During use, the earphones 7 mount within the outer ear canal and are frictionally retained within the canal via an expanded foam cover piece.

Necessary power, speaker and antenna conductors are molded or routed into the frame and as necessary extend from ports or coupled terminations at the frame (e.g. couplers 29, 30 of FIG. 2). The receivers 6 or 8 of FIG. 1 might electrically couple to the embedded antenna 15 at a provided termination between one of the clips 36 and appropriately exposed portion of embedded conductor 15.

Multi-Section frames, such as discussed with respect to FIG. 2, can also include suitable terminations to appropriately connect the embedded or routed conductors of the eyewear frame 14. Such connections can provide necessary external connections, as well as interconnect disjointed internal sections of the conductors, such as at junctures between the bow and brow pieces 16 and 18.

Figure 3:
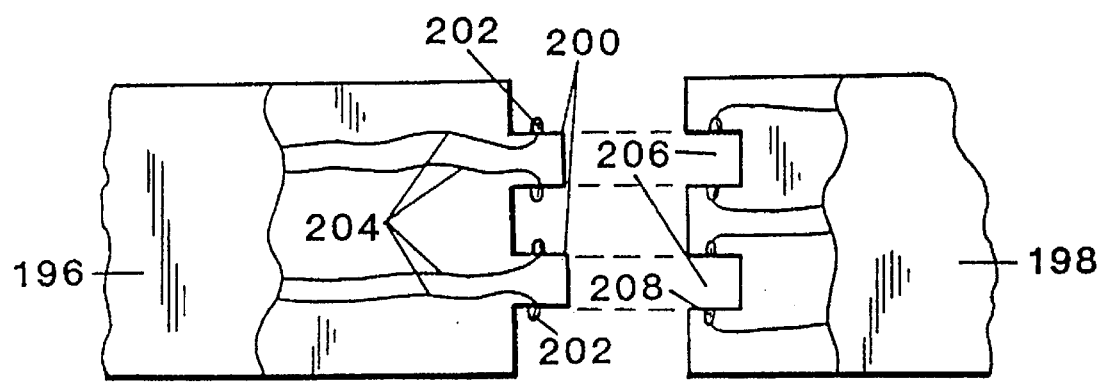
FIG. 3 is a detailed drawing of an electrified hinge arrangement.
Figure 4:
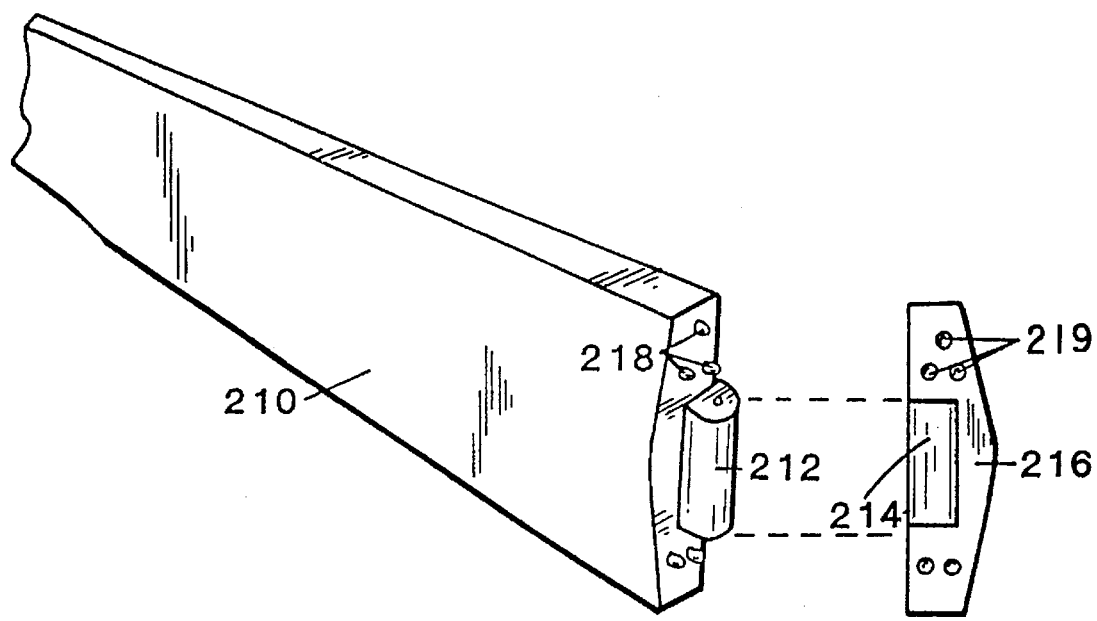
FIG. 4 is a detailed drawing of pin and socket couplers at hinged frame parts.
Figure 5:
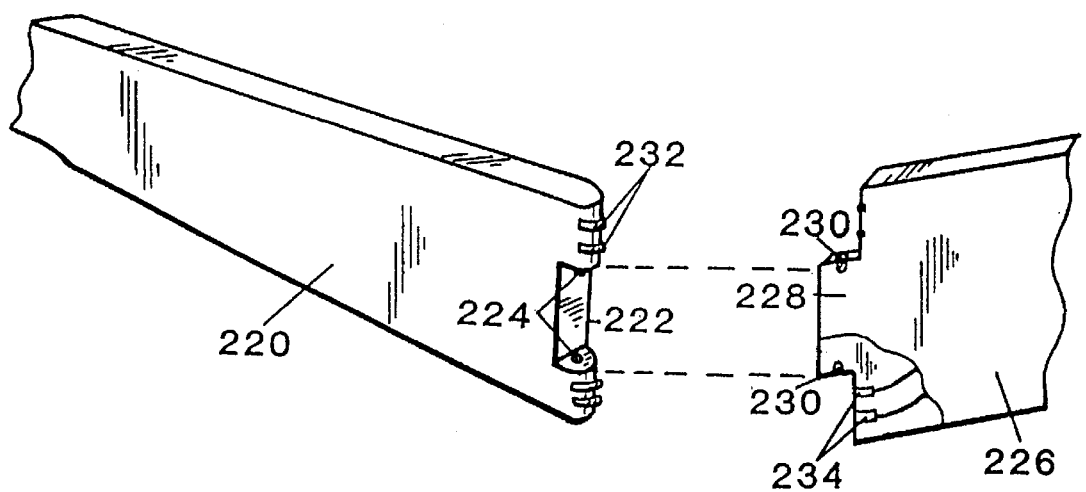
FIG. 5 is a detailed drawing of rub connections at hinged frame parts.

FIGS. 3, 4 and 5 show alternative couplings to disjointed conductors at the hinge joints between exemplary bow and brow pieces. FIG. 3 particularly shows a plan view in partial cutaway of a hinge joint at bow and brow pieces 196, 198. The bow piece 196 has a plurality of hinge projections 200 and from upper and lower surfaces of which project metalized contacts 202. Each contact 202 is connected to a single embedded conductor 204. The contacts 202 are electrically insulated from one another via the intermediate molded material which forms the bow piece 196.

The brow piece 198 includes a plurality of cavities 206 which mate with the projections 200. Metalized sockets 208 are formed into the cavities 200 to mate with the protruding contacts 202, upon snap coupling the bow and brow pieces 196, 198 to one another. Each socket 208 is connected to an embedded continuation of the conductors 204. Thus, a continuous electrical connection is made via the contacts 202 and sockets 208 connections over the length of the frame.

FIG. 4 shows an alternative construction wherein a bow piece 210 includes a hinge projection 212 which mates with a recessed cavity 214 at a brow piece 216. Separate pin ends 218 project from the bow piece 210 and are coupled to embedded conductors (not shown) that extend through the bow piece 210. Mating, electrified sockets 219 are formed into the brow piece 216 in a corresponding pattern and are coupled to embedded conductors (not shown) within the brow piece 216.

Not only do the pins and sockets 218, 219 interconnect the discontinuous embedded conductors, but upon folding and unfolding the bow piece 210 relative to the brow piece 216, an effective on/off swith action is achieved. Eyewear including such a hinge assembly preferably therefore contain the receiver circuitry within the brow piece 216 or at one of the bow pieces 210, and the batteries and/or power supply either within or mounted to the other bow piece 210. Upon folding the bow pieces 210 to a storage position against the brow 216, power is disconnected from the receiver circuitry, thereby doing away with the necessity of a separate on/off switch.

FIG. 5 depicts a snap hinge construction akin to that of FIG. 4, but wherein the bow piece 220 includes a hinge cavity 222 having resilient protrusions 224 which project into the cavity 222. The brow piece 226 includes a hinge projection 228 having sockets 230 which receive the resilient protrusion 224 to mechanically hinge the bow piece 220 to the brow piece 226.

Necessary electrical connections between the bow and brow pieces 220, 226 occur at a plurality of flat arcuate contacts 232 which mate with sockets 234 that are set into the hinged end of the brow piece 226 and coupled to embedded conductors.

A rubbing or self-cleaning type of electrical connection is particularly achieved with the contacts 232 and sockets 234 over a greater range of hinge rotation than with the assembly of FIG. 5. Such self-cleaning connections prevent possible open circuit conditions, which could occur with corrosion of one or both of the contacts 232 or sockets 234. Periodic cleaning with rubbing alcohol or other suitable chemical cleaners may also be performed to maintain the electrical integrity of the assemblies of FIGS. 3 through 5.

Figure 13:
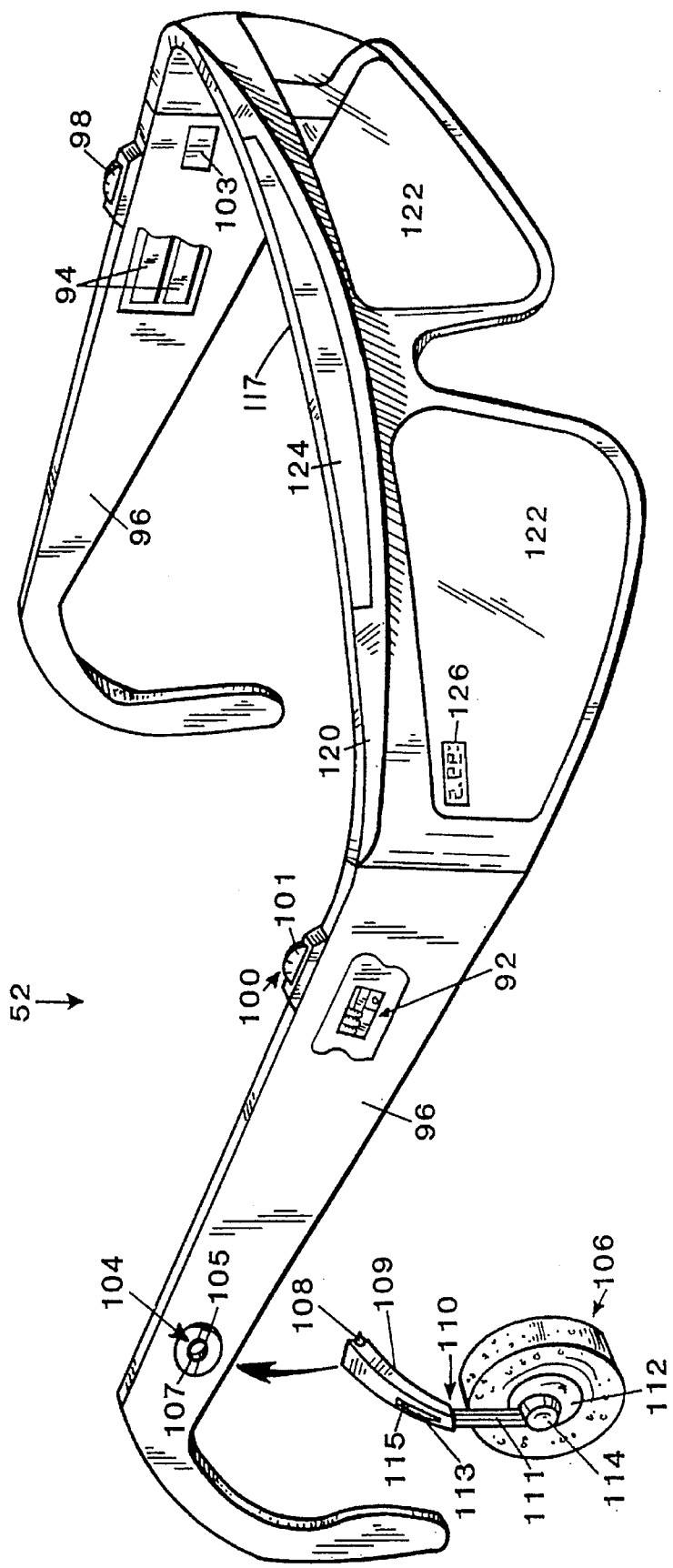
FIG. 13 is an isometric drawing of an eyewear framework including a solar panel visor and a laminated tuner display.

Still other alternative eyewear assemblies 50 and 52 are shown at FIGS. 6 and 13. The assemblies 50 and 52 provide integral mountings of the receiver circuitry within the eyewear frames. The frames also support pivotally mounted and axially adjustable ear phones. With attention to FIG. 6, the assembly 50 comprises a three piece frame 53 and supports a single, shield type lens 54. The lens 54 is secured to the brow piece 56 with spring fasteners (not shown). A grooved, resilient nose piece 57 detachably mounts to the lens 54.

Projecting from the left and right upper edge surfaces of the brow piece 56 are on/off/volume and tuner controls 58, 60. The receiver circuitry, which is not shown, otherwise is completely contained within the brow piece 56. A cover 62 snap mounts to the rear surface of the brow piece 56 to contain the circuitry within a provided cavity.

One or both bow pieces 64 can include replaceable batteries which can be of various types. A pair of exemplary cylindrical batteries 63 are shown at the bow biece 64. Alternatively, wafer batteries 66 are shown in the opposite bow piece. The battery type can be varied as desired relative to receiver power requirements and the frame shape.

Removeable covers 68 of appropriate shapes snap mount to each bow piece 64 to contain the batteries 63, 66. Depending, too, upon power requirements, some of the batteries can be spares.

In addition to batteries, a solar panel 70 can be mounted to the brow piece 56. In such a construction, associated conversion circuitry, reference FIG. 14, may be mounted in the brow piece 56 or one of the bow pieces 64, such as in the cavity containing the batteries 66. The solar panel 70 and conversion circuitry converts solar energy to electrical energy which, in turn, is coupled either to the receiver circuitry 72 or to charge the batteries 63, 66. Conventional, commercially available solar conversion circuits and related switching circuits are used to achieve this functionality. The useful life of the storage cells between rechargings is thereby increased. In lieu of a panel 70, a solar visor 120, such as shown in FIG. 13, coated with a number of solar cells 124 could be incorporated into the assembly 50.

Appended to the aft end of each bow piece 64 via a pivot pit 74 are adjustably mounted ear phones 76. The ear phones 76 can be pivoted and axially extended into or out of engagement with the ear, upon placement of the eyewear 50. A controlled pivoting action is obtained upon flaring a head 73 of the pin 74 to compressively capture a backing washer 75 and O'ring 77 to an annular opening (not shown) in the rear surface of the bow piece 64. A recess 79 formed in the front surface receives a flexible arm 80 of the earphone 76. The recess is cut at an angle (i.e., the lower edge is shallower than the top edge) to facilitate retaining the arm 80 to the bow piece 64 when not in use, that is if the arm 80 is rotated into axial alignment with the bow piece 64. Still other ear phone mountings are described below with respect to FIGS. 8 through 12.

An appropriate extension of each earphone 76 is obtained via a support collar 82 to which each speaker 77 is secured. The arm 80 is typically formed from a spring metal and spring biases the speaker 77 into engagement with the ear, independent of the inherent bias of the bow pieces 64. The collar 82 is mounted in extensible relation to the arm 80 to permit length adjustment.

Further features of note are that a socket 82 is formed into the bow piece 64 for containing each ear phone 76 at a storage position when the arm 80 is aligned with the bow piece 64, such as when the radio receiver is not being used. All conductors are also contained within a grooved or recessed wireway 39 let into the rear surface of the frames. A strip cover (not shown) typically covers the wireway 39 to hide the conductors.

Figure 7:
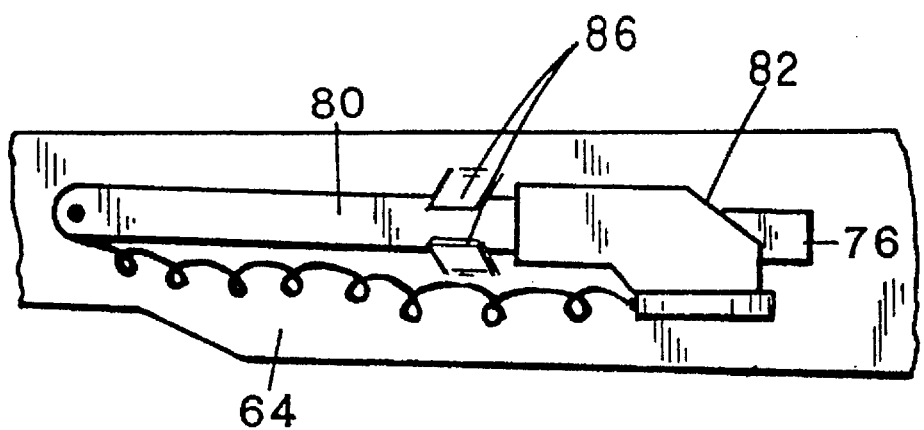
FIG. 7 is a detailed drawing of a bow piece including molded speaker restraints.

In lieu of a socket 82, FIG. 7 shows an arrangement in which the bow piece 64 includes a pair of projecting arms 86. The arms 86 capture or restrain the arm 80, upon pivoting the speaker assembly into parallel alignment with the bow piece 64. If rechargeable batteries are used, a socket connection 88 can also be provided adjacent to the compartment containing the rechargeable batteries to enable the coupling of the assembly 50 to a remote battery charger.

Referring to FIG. 13, another eyewear assembly 52 is shown wherein the receiver circuitry 92 and batteries 94 are arranged in opposite bow pieces 96. The receiver circuitry 94 typically comprises one or more hybrid or integrated circuits. An on/off/volume control 98 and tuner control 100 are mounted in the bow pieces 96 in close association to the batteries 94 and receiver circuitry 92. A cutout or window, on the inside surface of the bow 96 and aligned with the tuning knob 101, can permit the user to view channel selection without removing the eyewear. Depending upon the mounting position of the tuner, a mirror 103 can be mounted on an appropriate frame surface to facilitate tuner viewing. Alternatively, a liquid crystal display 126 that is coupled to the receiver circuitry 92 is unobtrusively secured to the side of the normal line of sight at one of the lenses or to an inner frame surface to facilitate tuning without removal of the eyewear. The display 126 can identify tuning indicia indicative of the station, frequency and/or volume.

The aft end of each bow piece 96 includes a keyed annular protrusion 104 where each earphone assembly 106 (only one of which is shown) is snap mounted in pivoting, length extensible relation to the bow piece 96. Each protrusion 104 includes a pair of slotted keyways 105 which open to an annular channel 107. Projections 108 extend from a collar bracket 109 of each earphone arm 110 and mount within the channel 107.

A spring steel arm 111 is secured to the bracket 109 at a slot 113 via a stop pin 115. A speaker 112 is secured to the arm and includes a foam outer ring 114. The effective length of the arm 110 can be increased or decreased by extending the arm 111 relative to the bracket 109 as necessary to align the earphone 106 to the user. The bracket 109 is typically constructed of a molded plastic.

With the insertion of the projections 108 into the keyways 105, the arm 110 is rotated and the projections 108 follow internal channel 107 to restrain the arm 110 to the bow piece 96. Attached speakers 112 can thereby be rotated and extended into alignment with the ear or into longitudinal alignment with the bow piece 96 when not being used.

A visor 120 projects above and forward of individual lenses 122. Secured to the upper surface of the visor 120 is a strip 124 which contains a plurality of solar panels. Suitable conductors (not shown) extend from the panels 124 and are connected to conversion circuitry which may be mounted within the bow or brow pieces 96, 117 or be external thereto to recharge the batteries as sunlight is available.

Figure 8:
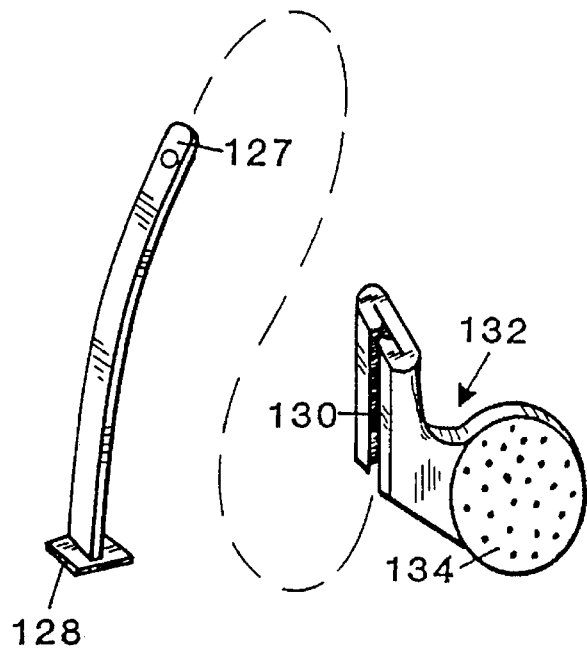
FIG. 8 is an isometric drawing of a spring biased, slideably extensible earphone.

FIGS. 8 through 12 show still other speaker mounting assemblies which can be used with any one of the eyewear assemblies 2, 13, 50 or 52. FIG. 8 particularly shows an arrangement of a spring steel arm 127 which includes an end stop 128. The arm 127 slide mounts within a slideway 130 of a molded earphone body 132 which contains a speaker 134. The arm 127 biases the speaker 134 to extend into the ear canal as opposed to lying parallel to the ear.

Figure 9:
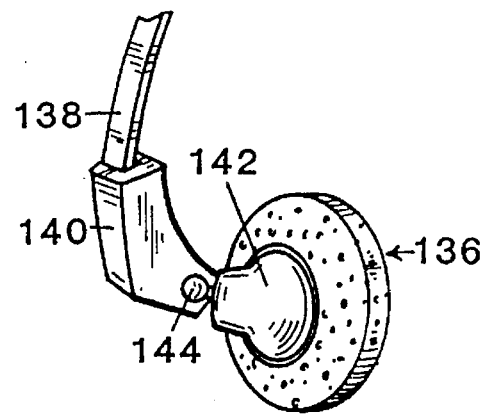
FIG. 9 is a detailed drawing of a speaker which separately pivots into or out of the ear.

FIG. 9 shows an earphone assembly 136 which includes a spring steel slide arm 138 which mates with a slideway containing body member 140. A speaker 142 mounts to the body 140 at a pivot pin 144. The arm 138 can be pivoted about a bow piece in the fashion of the arm 110 as the speaker 142 is length adjusted and/or rotated into engagement with the ear.

Figure 10:
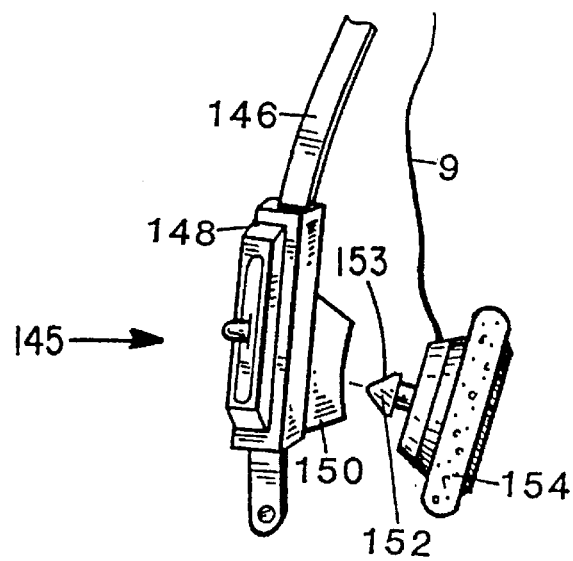
FIG. 10 is a detailed drawing of a speaker which plug mounts to an extension slide arm.

FIG. 10 shows an earphone assembly 145 wherein a spring steel, slide arm 146 supports a housing 148 which includes a plug-in socket 150. A protrusion 152 projects from the rear surface of a speaker 154 and interlocks with the socket 150. The speaker 154 can be slideably positioned along the arm 146 and may also be removed and/or replaced as necessary.

Figure 11:
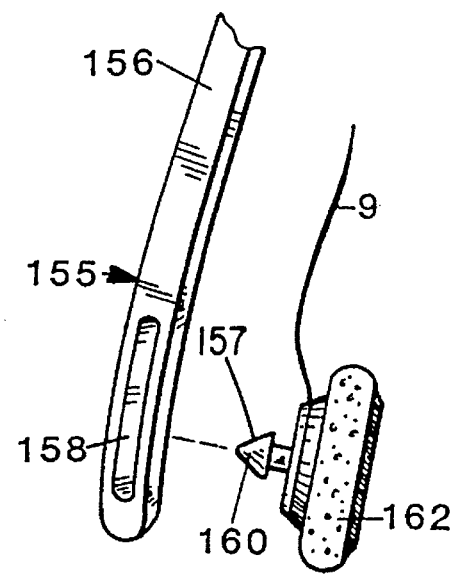
FIG. 11 is a detailed drawing of a speaker which plug mounts within a slideway of the extension arm.

FIG. 11 shows still another assembly 155 including a spring steel arm 156 having an elongated slideway 158. A resilient, shouldered pin 160 projects from the rear of the speaker 162 and mounts to the slideway 158. The pin 160 deforms during mounting and limits movement of the speaker 162 along the slideway 158.

Although individual conductors 9 are shown as running from each of the speakers of FIGS. 10 and 11, it is to be appreciated that the slide arms 127, 138, 146, and 156 can serve as an electrical conductor, since they are constructed of spring steel, or can include a laminated strip conductor which mates with a conductor, such as a metalized surface 153 or 157 at the speaker 154, 162. A wiping type of electrical contact can be constructed between the eyewear frame and the arm in the fashion of the hinge assemblies of FIGS. 3 through 5 to assure electrical contact.

Figure 12:
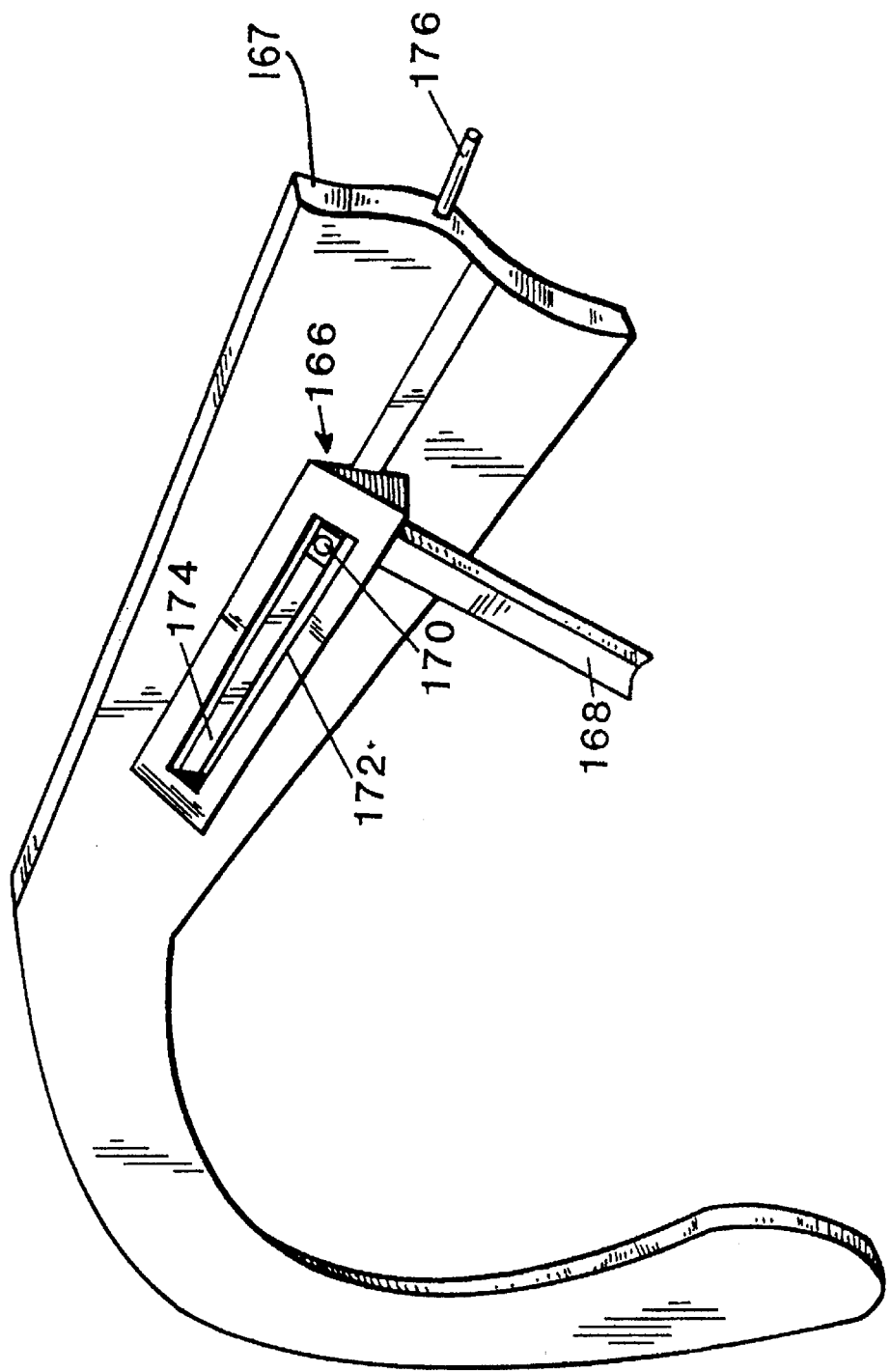
FIG. 12 shows a bow piece including an electrified slide channel which permits longitudinal adjustment of the speaker position.

In the latter regard, FIG. 12 discloses a molded longitudinal slideway 166 at a bow piece 167 which receives and restrains a slide arm 168 of an associated speaker assembly (not shown) within the slideway 166. A projection 170 at the end of the slide arm 168 is restrained to a slot 172 formed in the outer surface of the slideway 166. A laminated electrical conductor 174 engages the arm 168 as the arm 168 moves along the slot 172 and makes an electrical connection to an embedded conductor 176. In lieu of a projecting arrangement, the slideway 166 can be molded into the bow pieces.

Figure 14:
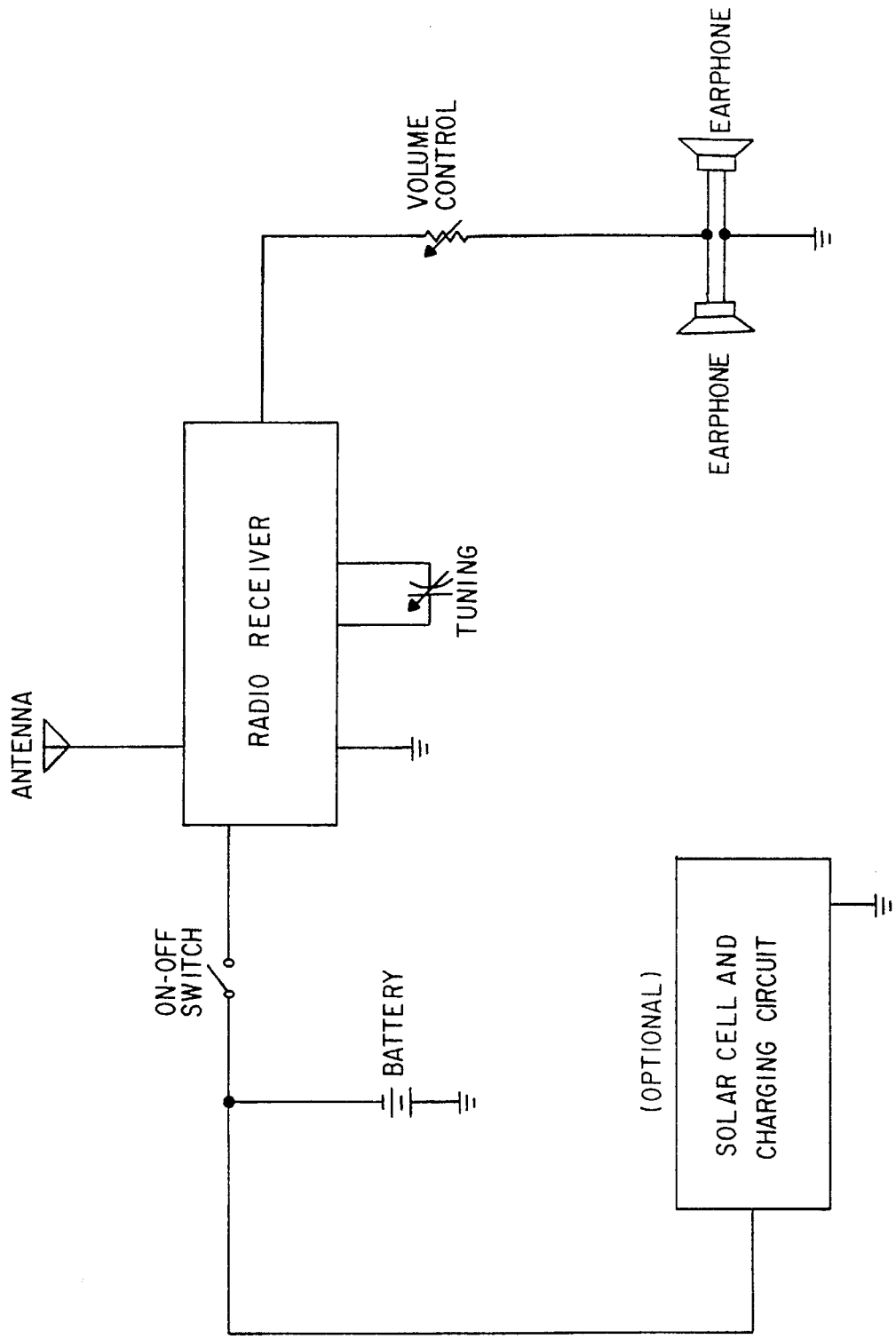
FIG. 14 shows a functional block diagram of the receiver and power supply circuitry of the invention circuitry of the present invention.

FIG. 14 depicts a block diagram of a typical circuit organization of the present eyewear. Although not shown in detail, the receiver circuitry is contemplated to be of conventional integrated circuit or hybrid construction and to be compatible with the dimensional constraints of the eyewear assembly. The batteries, solar cells, LCD displays, and conversion circuits etc. are selected to also meet the dimensional constraints and normal power requirements for the intended environment. When a solar cell is used, a switch is included between the battery and receiver circuitry to appropriately isolate one from the other and facilitate recharging.

FIG. 15 depicts a further alternative eyewear assembly 240. The assembly 240 includes a multi-section frame 241 having a brow piece 242, a pair of hinged bow pieces 244 and 246, and a detachable lens 248. A detachable nose piece 256 mounts to the lens 248.

A pair of earphones 250 are supported from the bow pieces 244, 246 at lengths of coiled conductors 251, 252 which extend from ports 254. The earphones 250 mount within a user's ear canals upon appropriately extending the conductors 251, 252. The ports 254 may comprise apertures from which the conductors 251, 252 loosely extend or alternatively plug type terminals. The earphones 250 may also be secured to the frame 241 with various pivoting and length extensible arms similar to those described above with respect to FIGS. 6 through 13.

Separate battery compartments 260, 262 are provided at the bow pieces 244, 246 and contain appropriate batteries 264. A cover 266 retains each battery 264 within its compartment 260, 262.

A radio receiver 258 is mounted within the brow piece 242 beneath a cover 266. Appropriate on/off, volume, AM/FM, and tuning control actuators 268, 270, 271 and 272 are positioned about the periphery of the brow piece 242 to facilitate ready accessibility by the user.

A strip circuit 274 containing a number of discrete conductors is mounted within a wireway 276 routed into the bow piece 242. The circuit 274 is routed between the brow and bow pieces 242, 244 and 246 at flexible hinge sleeves which are described in greater detail at FIGS. 16 through 18, below. Normal hinge flexion is permitted at the hinge sleeves without damage to the strip circuits 274. The brow and bow pieces 242, 244 and 246 can be secured together with conventional hinge connections and/or with the sleeves.

Audio reception is augumented with one or more electrical contacts 278 which are positioned about the frame at sockets 280. The contacts 278 mate with an antenna conductor 282 that is routed through the frame 241 to the sockets 280. The contacts 278 electrically couple the user's skin to the receiver 258 to improve reception. Multiple contacts 278 are typically provided at a number of locations about the frame to assure a maintained reception and electrical contact to the user.

The lens 248 is secured to the brow piece 242 at a number of locations to provide structural integrity and facilitate wear. A central twist type connector 284 secures a center of the lens 248 to the brow piece 242. Tanged ends 288 of the lens 248, which are shaped to interlock with cavities 286 at the brow piece 242, simultaneously restrain the outer ends of the lens 248 to the brow piece 242. The upper peripheral edge of the lens 248 is also retained to a groove 290.

The foregoing attachments allow the lens 248 to be replaced as desired with alternative lenses, such as treated for optical clarity, light polarization, aesthetic coloration, etc.. More of the details of the above and alternative lens fasteners are described with respect to FIGS. 19 to 21.

Figure 19:
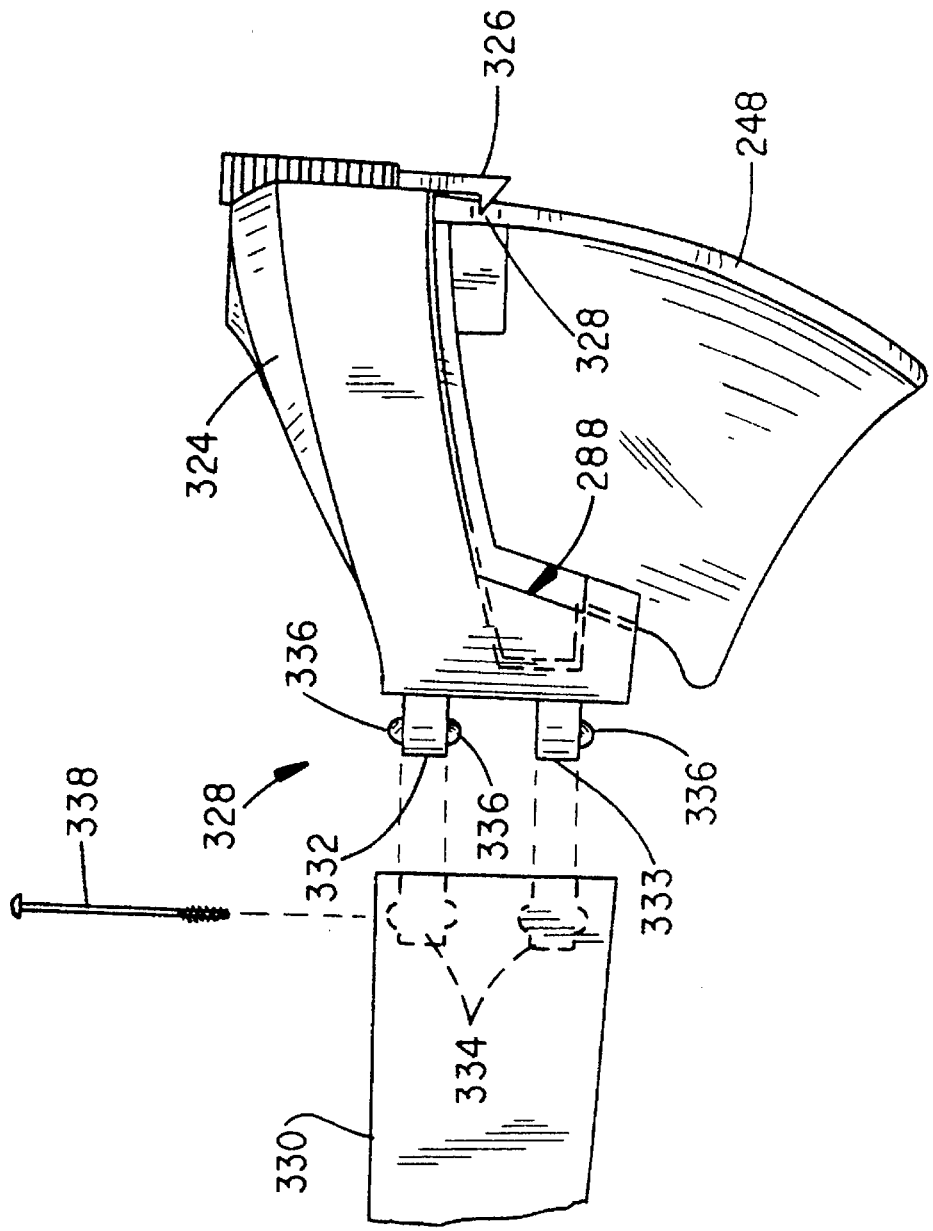
FIG. 19 is a plan drawing of alternative snap and pin connected hinge assembly.

Turning attention to FIG. 16, an exploded assembly drawing is shown to an improved hinged joint 292 such as might be formed between the brow and bow pieces 242, 246. In lieu of a piano hinge joint, such as depicted at FIGS. 2 through 5, the joint includes a flexible, tubular sleeve 294 which extends between cavities 296 and 298 at the brow and bow pieces 242, 246. The sleeve 294 may be used alone or in combination with other types of hinging, whether of a piano type, such as shown at FIGS. 2, 4 and 19, or a snap-apart type, such as shown at FIGS. 3, 5 and 19. The flexibility of the sleeve material permits its use directly as a hinge member and also protects the conductors of the circuit 274 which extend between the brow and bow pieces 242, 246.

As depicted at FIG. 16, the sleeve is retained to the respective brow and bow pieces 242, 246 with a number of pin fasteners, such as rivets, which mate to holes 300, 302 formed into the brow and bow pieces 242, 246. A bore 304 of the sleeve receives the strip circuit 274 or various other conductors contained within the bore 304. A portion of the sleeve 294, such as the center, is typically partially exposed at the joint 292 to facilitate the hinge action.

The sleeve 294 is constructed of a flexible, electrically insulative material. Preferrably, the material accomodates repeated flexions of the joint 292 without cracking or abrading the conductors which pass through the bore 304.

FIG. 17 depicts an alternative construction of a sleeve retainer 306, which can serve as a hinge or merely as a protective sleeve, and which retainer does not require pin fasteners. The sleeve 306 includes a bore 308 which receives conductors that are threaded through the sleeve 306. Opposite ends of the sleeve 306 include flanges 310 which are formed to mate with mating recesses formed into the brow 242 and bows 246.

FIG. 18 depicts yet another sleeve 312 which may be used as a hinge between the brow and bow pieces 242, 246. The sleeve 312 includes a longitudinal bore 314 and at least one longitudinal slit 316 to facilitate access to the bore 314. Alternatively, the sleeve 312 may be slit into two portions 318, 320, such as where the sleeve is used in combination with another hinge assembly, for example, a snap-apart hinge such as shown at FIG. 19.

Cylindrical flanges 322 are formed into the opposite ends of the sleeve 312 and mate with recesses formed into the brow and bow pieces 242, 246. A number of vertical ribs 323 project from the sleeve to facilitate the hinge action at the brow and bow pieces and bending of the sleeve 312.

Figure 20:
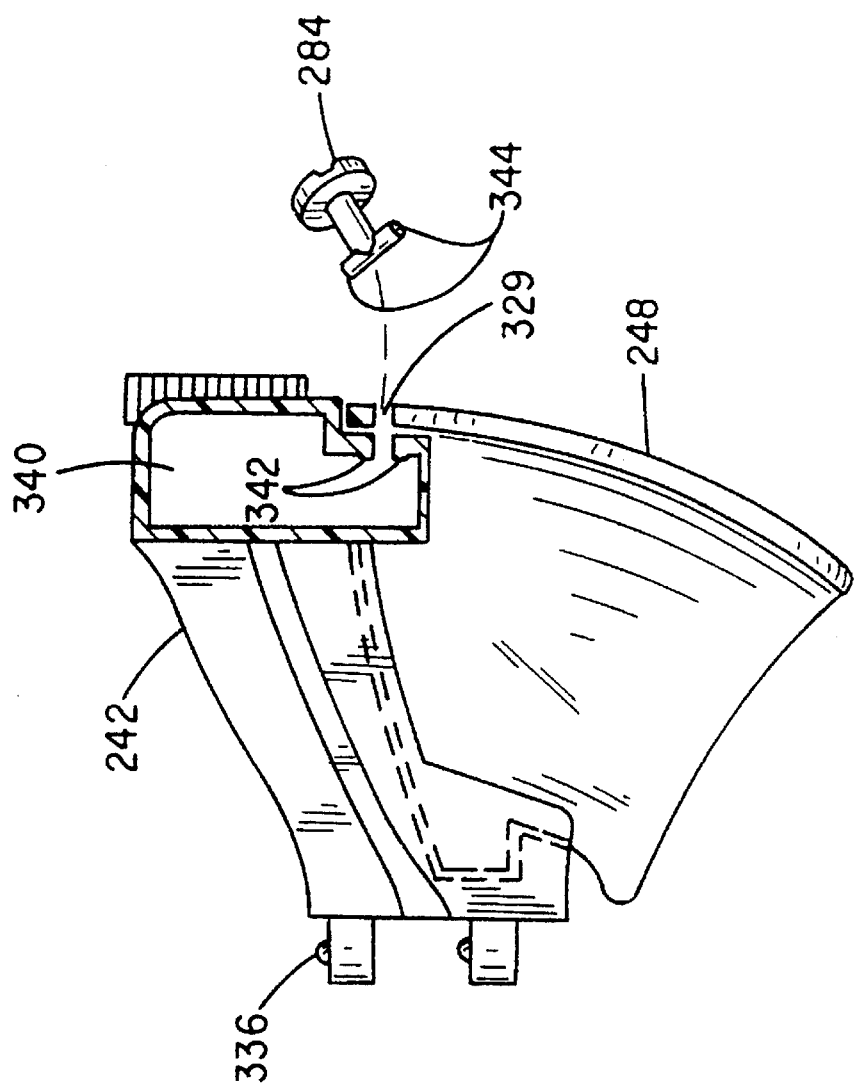
FIG. 20 is a plan drawing shown in partial cross section of an alternative lense retainer.
Figure 21:
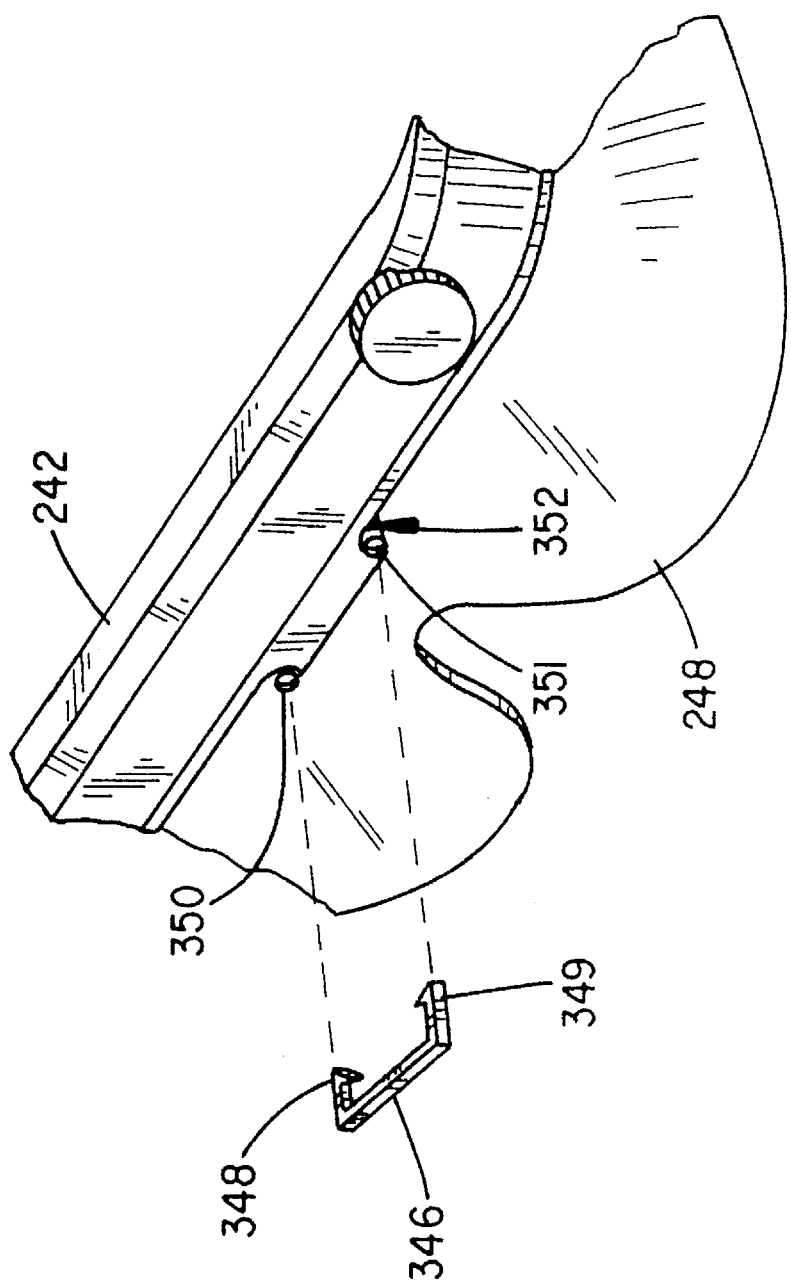
FIG. 21 is a persective drawing of an alternative lense retainer.

Referring to FIGS. 19 through 21, a number of views are shown of alternative retainers which might be used to secure the lens 248 to the eyewear brow piece. FIG. 19 shows a brow piece 324 which includes an integral, resilient, tanged member 326 mates with an aperture 328 which is formed into a lens 248. The member 326 latches to the lens 248 upon sliding the lens 248 beneath the member 326. Tanged ends 288 of the lens 248 simultaneously interlock with cavities 286 formed into the brow piece 324.

A snap-apart hinge joint 328 is further provided between the brow piece 324 and a bow piece (not shown) at FIG. 20. A pair of projections 332, 333 extend from the brow piece 324 and interlock with a pair of recesses 334 at the bow piece 330. Spherical protrusions 336 are provided at the projections 332, 333 to facilitate the snap action. Also shown is a threaded hinge pin 338 which might be used as warranted.

FIG. 20 depicts a cross section view in exploded assembly of the brow piece 242 and the fastener 284. The fastener 284 mounts through an aperture 329 at the lens 248 and extends into a cavity 340 which contains the circuitry 258. A pair of protrusions 342 at the cavity 340 cooperate with a pair of wings 344 at the fastener 284, such that upon rotation of the wings with respect to the protrusions 342, the lens 248 is compressively restrained to the brow piece 242.

FIG. 21 lastly depicts a lens retainer 346 which provides a pair of tangs 348, 349. The tangs 348, 349 mount through apertures 350, 351 in the lens 248 and interlock with recesses 352 in the brow piece 242.

While the subject invention has been described with respect to various presently considered embodiments, and various modifications, improvements along with considered modifications and changes thereto, it is to be appreciated still other constructions may suggest themselves to those of skill in the art. Accordingly, the following claims should be interpreted to include all those equivalent embodiments within the spirit and scope thereof.

What is claimed is:

1. Eyewear apparatus comprising:
   a) a framework including a brow portion and first and second bow portions, wherein each of said brow and first and second bow portions includes a cavity exposed on one surface of said framework, which cavities extend about said framework without interruption and with the cavities of the first and second bow portions terminating at the cavity of the brow portion, and including a plurality of covers which mount to said cavities, and wherein first and second hinges secure said first and second bow portions to said brow portion, wherein each of said first and second hinges is constructed of a flexible tubular material having a bore and including a slit opening to said bore and wherethrough electrical conductors are fitted to extend between said cavities;
   b) optical lens means coupled to said framework;
   c) radio receiver means coupled to said framework and including a battery;
   d) first and second speakers; and
   e) wherein said battery, radio receiver means and conductors mount within said cavities and said conductors electrically couple said radio receiver, first and second speakers and battery to one another.

2. Apparatus as set forth in claim 1 including a lens clip, wherein said clip includes a tang which interlocks with said brow portion such that said clip detachably retains said lens to said brow portion.

3. Apparatus as set forth in claim 1 including electrical contact means connected to said receiver means and projecting from said framework for contacting the skin of a wearer of said eyewear to electrically connect the wearer to said radio receiver means as an antenna.

4. Eyewear apparatus comprising:
   a) a framework including a brow portion, lens means mounted to said brow portion, and first and second bow portions mounted to project from said brow portion;
   b) radio receiver means mounted to said framework;
   c) first and second speakers coupled to said radio receiver means and each having an extension arm; and
   d) retainer means for pivotally securing said first and second speakers to said first and second bow portions and including means for spring biasing the rotation of each arm between a listening position and a storage position, where each of said first and second speakers engages one of the first and second bow portions.

5. Apparatus as set forth in claim 4 wherein each of said first and second bow portions includes an elongated slot and said first and second speaker means may be positionally varied therealong.

6. Apparatus as set forth in claim 4 wherein the extension arm of each of said first and second speakers comprises a plurality of telescoping arm portions.

7. Apparatus as set forth in claim 4 wherein said framework includes solar energy conversion means for recharging batteries contained within said framework.

8. Apparatus as set forth in claim 4 wherein said first and second bow portions each include a slotted keyway and the extension arm of each of said first and second speakers includes a projection which mates with the keyway of one of said first and second bow portions.

9. Apparatus as set forth in claim 4 wherein said first and second bow portions pivotally couple to said brow portion at hinge means and further including mating electrical coupler means integrally formed with said bridge and bow portions and cooperatively mounted relative to said hinge means for coupling and uncoupling a plurality of conductor segments contained within said brow and bow portions to one another as the bow portions are folded away from and into parallel alignment with the brow portion.

10. Apparatus as set forth in claim 4 wherein said framework includes antenna means contained within said framework and means for electrically coupling said radio receiver means thereto.

11. Apparatus as set forth in claim 4 including means for recharging storage batteries contained within said framework.

12. Apparatus as set forth in claim 4 including electronic display means laminated to said framework for viewing control indicia of said radio receiver means without removing the eyewear.

13. Apparatus as set forth in claim 4 wherein said retainer means comprises a pin member which mounts through the extension arm of each of said first and second speakers and said first and second bow portions, a compressible member and a backing washer thereto.

14. Apparatus as set forth in claim 4 including retention means for securing said first and second speakers to said first and second bow portions at said storage position.

15. Apparatus as set forth in claim 14 wherein said retention means comprises first and second recesses formed in the framework to receive each speaker in nested relation thereto.

16. Apparatus as set forth in claim 4 wherein said first and second bow portions each include an electrically conductive keyway and wherein said first and second speakers include first and second electrically conductive projections which mate with said keyways.

17. Eyewear apparatus comprising:
 a) a framework including a brow portion, lens means mounted to said brow portion, and first and second bow portions mounted to project from said brow portion;
 b) first and second speakers;
 c) radio receiver means including a first housing supporting said first speaker and further including means for pivotally coupling said first housing to said first bow portion; and
 d) power supply means coupled to said radio receiver means and including a second housing supporting said second speaker and further including means for pivotally coupling said second housing to said second bow portion.

18. Apparatus as set forth in claim 17 wherein said first and second bow portions pivotally couple to said brow portion at hinge means, wherein said brow portion and first and second bow portions each include a plurality of electrical couplers which couplers are mounted to mate with one another when the first and second bow portions are folded transverse to the brow portion.

19. Eyewear apparatus comprising:
 a) a framework including a brow portion and first and second bow portions, wherein said brow portion includes a flexible tang, wherein said brow and first and second bow portions each include an exposed cavity on one surface of said framework, which cavities coextensively extend about said framework, and wherein the cavities of the first and second bow portions terminate at the cavity of the brow portion, and including a plurality of covers which mount to said cavities;
 b) optical lens means including an aperture which receives said tang for detachably securing said lens means to said brow portion;
 c) radio receiver means coupled to said framework;
 d) first and second speakers;
 e) electrical contact means connected to said receiver means and projecting from said framework for contacting the skin of a wearer of said eyewear to physically and electrically connect the wearer to said radio receiver means as an antenna; and
 f) wherein said battery, radio receiver means and a plurality of conductors mount within said cavities and said conductors electrically couple said radio receiver, first and second speakers and battery to one another.

20. Apparatus as set forth in claim 19 wherein said first and second bow portions pivotally couple to said brow portion at hinge means and including mating electrical coupler means integrally formed with said brow and bow portions and cooperatively mounted relative to said hinge means for coupling and uncoupling a plurality of conductor segments contained within said brow and bow portions to one another as the bow portions are folded away from and into a parallel alignment with the brow portion.

21. Apparatus as set forth in claim 19 including first and second jointless hinge means for securing said first and second bow portions to said brow portion, wherein said first and second hinge means each comprise first and second tubular members, wherein said tubular members include first and second portions which interlock with said brow and said first and second bow portions, wherein a longitudinal slit extends the length of and opens to a longitudinal bore of each tubular member and wherethrough electrical conductors extend between said brow and first and second bow portions.

22. Eyewear apparatus comprising:
 a) a framework including a brow portion; lens means mounted to said brow portion and including a lens clip, wherein said clip includes a tang which interlocks with said brow portion for detachably retaining said lens means to said brow portion; first and second bow portions; and first and second jointless hinge means for securing said first and second bow portions to said brow portion, wherein each of said first and second hinge means includes a bore wherethrough electrical conductors extend between said brow and first and second bow portions;
 b) radio receiver means including a battery mounted to said framework;
 c) first and second speakers; and
 d) wherein said battery, radio receiver means and speakers are coupled to one another with said electrical conductors.

23. Apparatus as set forth in claim 22 wherein said brow and said first and second bow portions each include an exposed cavity on one surface of said framework, wherein said first and second hinge means comprise tubular elastomer members, wherein each tubular member has a longitudinal bore and wherein a longitudinal slit extends the length of and opens to each bore wherein said battery, radio receiver means, speakers and electrical conductors mount within said cavities and bore, and including a plurality of covers which mount to said cavities.

24. Apparatus as set forth in claim 23 wherein said tubular members include first and second portions which interlock with recesses at said brow and first and second bow pieces.

25. Apparatus as set forth in claim 22 including means connected to said receiver means and projecting from said framework for contacting the skin of a wearer of said eyewear to physically and electrically connect the wearer to said radio receiver means, whereby the wearer is electrically connected to said receiver as an antenna.

26. Apparatus as set forth in claim 22 wherein said lens clip includes first and second portions which interlock with first and second portions of said brow portion.

* * * * *